3,268,552
PREPARATION OF 1,4-DIAMINOANTHRAQUI-
NONE-2,3-DICARBOXIMIDE DYESTUFFS
Takashi Akamatsu, Ashiya-shi, and Eiji Yamada, Takat-
suki-shi, Japan, assignors to Sumitomo Chemical Com-
pany, Ltd., Osaka, Japan, a corporation of Japan
No Drawing. Filed July 3, 1964, Ser. No. 380,125
Claims priority, application Japan, July 8, 1963,
38/35,985
10 Claims. (Cl. 260—326)

This invention relates to a process for producing anthra-
quinone disperse dyestuffs. In another aspect, it relates
to the improvement in the production of 1,4-diaminoan-
thraquinone-2,3-dicarboximide disperse dyestuffs.

The 1,4-diaminoanthraquinone-2,3-dicarboximide com-
pounds (I) according to the invention are known as blue
disperse and cation dyestuffs suitable for dyeing synthetic
fibers such as aromatic polyesters, acetylcellulose, poly-
acrylonitrile, polyamides, and the like, or as their inter-
mediates.

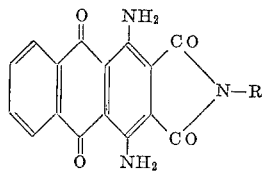

(R meaning a radical selected from the group of ali-
phatic, cycloaliphatic, aromatic-aliphatic, and aromatic
radicals.)

So far, the process for the production of these dyestuffs
has been reported, for example, in the specifications of
Japanese patent publication No. 3,384/1955, and U.S.
Patents No. 2,628,963, No. 275,356 and No. 2,770,625.
These specifications have taught that the dyestuffs could
be produced by heating 1,4-diaminoanthraquinone-2,3-di-
nitrile with concentrated sulfuric acid, for example, 98.2%
sulfuric acid, at 150° C. for 1 hour, thereby to prepare
the dicarboximide having the Formula II,

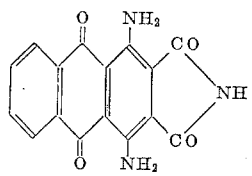

and allowing the resulting dicarboximide to react with an
amine to produce the compound (I). In this process,
however, the latter step, i.e. the reaction of the dicarboxi-
mide with an amine, needs a solvent having a high boiling
point to ensure the reaction at such a high temperature
as about 175° to 200° C., using an autoclave. Further-
more, the dyestuff product is reddish-dull in its shade, and
the overall yield is not satisfactory.

To overcome these difficulties, the present inventors
have examined a process for the production of the dye-
stuffs employing, as the intermediate, 1,4-diaminoanthra-
quinone-2,3-dicarboxylic acid anhydride, rather than the
dicarboximide (II), and reached the present invention.

Accordingly, an object of the present invention is to
provide an improved process for producing 1,4-diamino-
anthraquinone-2,3-dicarboximide compounds which is ad-
vantageous in that it permits moderate reaction conditions
with simple procedures and that it gives dyestuffs having
brilliant blue shade in high yield, as compared with the
prior processes. Other objects will be obvious from the
following description.

Thus, the invention provides a process for producing
1,4-diaminoanthraquinone-2,3-dicarboximide compounds
having the general formula,

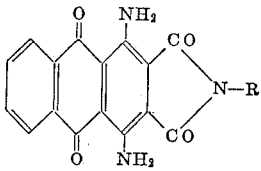

wherein R means a radical selected from the group con-
sisting of aliphatic, cycloaliphtic, aromatic-aliphatic, and
aromatic radicals, which comprises treating 1,4-diamino-
anthraquinone-2,3-dinitrile with fuming sulfuric acid hav-
ing an $SO_3$ concentration of 0% to 30% at a temperature
of 10° to 50° C. to form at least one member selected
from the group consisting of 1-hydroxy-3-imino-4,7-di-
amino-5,6-phthaloylisoindolenine and its sulfone deriva-
tive, heating the product in an aqueous alkaline solution,
acidifying the solution to obtain at least one member se-
lected from the group consisting of 1,4-diaminoanthraqui-
none-2,3-dicarboxylic acid and its acid anhydride, and
treating the product with an amine having the general for-
mula of R—$NH_2$, wherein R has the same meanings as
identified above, at a temperature of 50° to 130° C.

In the process of the present invention as identified
above, the intermediate product obtained by the treatment
of the dinitrile with fuming sulfuric acid, followed by the
alkali treatment and the acidification is mentioned as at
least one member selected from the group consisting of
1,4-diaminoanthraquinone-2,3-dicarboxylic acid and its
acid anhydride. However, the dicarboxylic acid and its
acid anhydride closely resemble each other in their prop-
erties, and the intermediate product is actually composed
essentially of the acid anhydride. Accordingly, the inter-
mediate product will be mentioned herein as the acid an-
hydride for convenience.

As for the production of 1,4-diaminoanthraquinone-
2,3-dicarboxylic acid anhydride, there are descriptions in
the specifications of U.S. Patent No. 2,770,625 and Ger-
man Patent No. 950,949 that it can be produced by heat-
ing 1,4-diaminoanthraquinone - 2,3 - dinitrile in 60° Bé.
sulfuric acid at 160° to 165° C. According to the thor-
ough investigation by the present inventors, it has been
found that the dicarboxylic acid anhydride so produced
can be obtained merely in small amounts as a by-product.
Although the literatures refer to the subsequent step of
the reaction between the dicarboxylic acid anhydride and
an aromatic diamine, the objective product should be quite
different from that according to the present invention,
since the actual product at the first step is not the dicar-
boxylic acid anhydride and the objective product is a kind
of vat dyes.

In carrying out the present invention, 1,4-diaminoan-
thraquinone-2,3-dinitrile is treated with fuming sulfuric
acid having an $SO_3$ concentration of 0% to 30% at a
temperature of 10° to 50° C. In general, the dinitrile is
added slowly to the fuming sulfuric acid, preferably while
being agitated, and the mixture is kept at the temperature
for several hours. Thereafter, the mixture is poured
into ice-water and the precipitated product is separated.
The resulting product is 1-hydroxy-3-imino-4,7-diamino-
5,6-phthaloylisoindolenine, its monosulfone derivative or
a mixture thereof.

The proportion of the amount of the isoindolenine and
that of the sulfone varies depending upon the $SO_3$ concen-
tration of the fuming sulfonic acid. When fuming sul-
furic acid having an $SO_3$ concentration of lower than
about 5% is employed, the main product is the isoindole-
nine, while the proportion of the isoindolenine sulfone is
increased with the increase of the $SO_3$ concentration of
fuming sulfuric acid. When fuming sulfuric acid having an SO₃ concentration of 10% to 20% is employed, the main product is the isoindolenine sulfone.

The monosulfone derivative of the isoindolenine is unstable at acidic condition, but is dissolved in aqueous alkaline solution in red color, thereby to be readily hydrolyzed to the monosulfone derivative of 1,4-diaminoanthraquinone-2,3-dicarboxylic acid, which is in turn almost instantaneously hydrolyzed, upon acidification, to form free 1,4-diaminoanthraquinone-2,3-dicarboxylic acid anhydride having blue color.

As to the free isoindolenine, the same applies for the hydrolysis with alkali and acid. Since the hydrolysis reaction of the isoindolenine monosulfone at an alkaline condition proceeds more rapidly than in that of the free isoindolenine, an SO₃ concentration of about 8% to 20% is particularly preferable.

The SO₃ concentration of higher than 30% is not suitable since it forms an unserviceable orange by-product which is comparatively stable to alkali and acid and is presumably the disulfone derivative of the isoindolenine.

The product obtained by the treatment of the dinitrile with the fuming sulfuric acid is then heated in an aqueous alkaline solution, whereby the isoindolenine ring is hydrolyzed to the dicarboxylic acid as mentioned above. The aqueous alkaline solution may be an aqueous alkali hydroxide solution having pH of higher than 12, preferably pH of 12.5 to 13.5. If desired, an alkaline buffer solution may be employed. The temperature for the alkaline hydrolysis is suitably at 80° to 100° C.

Then, the alkali-hydrolyzed solution is acidified with an acid. For that purpose, a mineral acid, such as hydrochloric acid, sulfuric acid, phosphoric acid and the like, is suitable. The acidification is in general effected up to 1 to 20% acid concentration. To obtain the dicarboxylic acid anhydride having high purity, the acidification procedure is preferably conducted at such a high temperautre as 80° to 100° C.

These reaction steps, in the case of passing the sulfone of the isoindolenine, can be represented as follows.

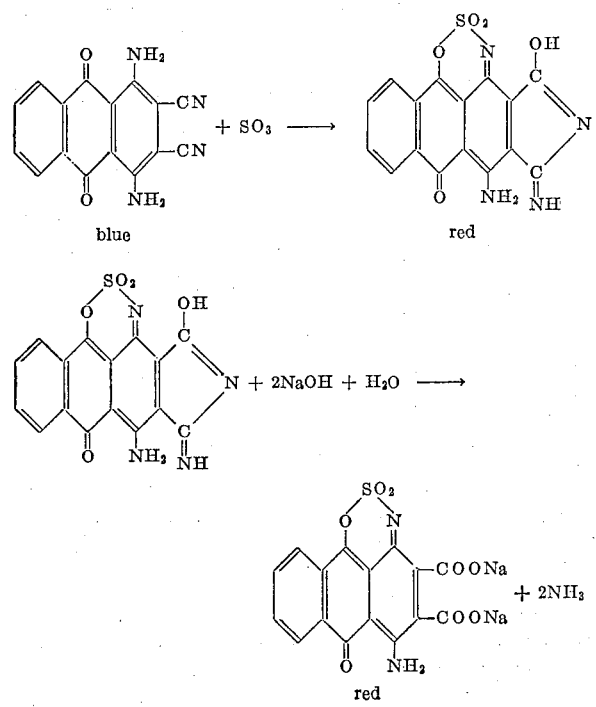

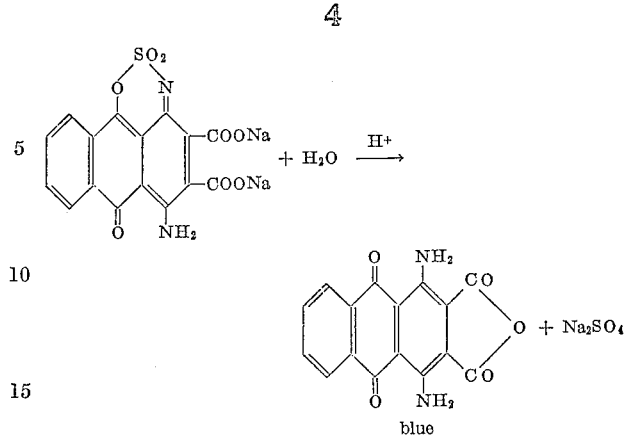

In the present invention, 1,4-diaminoanthraquinone-2,3-dicarboxylic acid anhydride which may be regarded essentially as a novel compound is subjected to a reaction with a primary amine at a temperature of 50° to 130° C. to form the objective dyestuffs having the Formula I.

The reaction of 1,4-diaminoanthraquinone-2,3-dicarboxylic acid anhydride with a primary amine is extremely advantageous as compared with the reaction of 1,4-diaminoanthraquinone-2,3-dicarboximide with a primary amine as described in the specification of Japanese patent publication No. 3,384/1955. This is due to the fact that the dicarboxylic acid anhydride is more readily soluble in solvent and more reactive to amine than the dicarboximide. Hence, the present reaction proceeds more rapidly and smoothly at such a low temperature as identified above, than the case of the dicarboximide where the reaction has to be conducted in an autoclave in a high boiling solvent at such a comparatively high temperature as higher than 170° C., substantially at 170° to 200° C., because of its low reactivity. Besides, the procedure of the present reaction is very easy in that isolation of the dyestuff product by addition of an alcohol as in the prior dicarboximide process is not necessary. Moreover, the total yield in the present process is exceedingly higher than in the dicarboximide process. Concretely speaking, the total yield in the present process using isobutylamine is 84.1% based upon the amount of the starting dinitrile, while the yield in the dicarboximide process in Japanese patent publication No. 3,384/1955 is 75.3% at highest.

In the reaction of the dicarboxylic acid anhydride with an amine, a solvent which is inert to the anhydride may be employed. The solvent may be an ordinary organic solvent, such as benzene, toluene, monochlorobenzene, ortho-dichlorobenzene, nitrobenzene and others, advantageously a lower alcohol such as methanol, ethanol, propanol, butanol, etc. and a mixed solvent containing the same. It is a feature of the present invention that such a lower alcohol which is not suitable in the prior process can be employed as the reaction medium.

The reaction temperature is arbitrarily chosen depending upon the combination of amine and the solvent, but ordinarily is within the range of about 50° to 130° C., preferably about 60° to 120° C., more preferably about 100° C.

The primary amine to be reacted with 1,4-diaminoanthraquinone-2,3-dicarboxylic acid or its anhydride is of aliphatic, cycloaliphatic, aromatic-aliphatic, and aromatic groups, which may have a substituent or substituents. Typical examples include saturated and unsaturated alkylamine, hydroxyalkylamine, alkoxyalkylamine, alkylenediamine, hydroxyalkylenediamine, alkylaminoalkylamine, alkylaminoxyalkylamine, dialkylaminoalkylamine, dialkylaminoxyalkylamine, and other aliphatic amine; cyclohexylamine, its nucleus-substituted derivatives, and other cycloaliphatic amine; benzylamine, phenylethylamine, its derivatives, and other aromatic-aliphatic amine; aniline, naphthylamine, alkylaminoaniline, dialkylaminoaniline, their nucleus-substituted derivatives, and other aromatic amine; and the like.

A more comprehensive understanding of the invention can be obtained by referring to the following illustrative examples which are not intended, however, to unduly limit the invention.

Example 1

To 120 g. of 10% oleum (fuming sulfuric acid having 10% $SO_3$ concentration), 10.0 g. of 1,4-diaminoanthraquinone-2,3-dinitrile is added portionwise at 30° C. The stirring is continued for 2 hours at the same temperature. Then the reaction mixture is added slowly at a temperature of 0° to 5° C. into 1200 g. of ice water to form precipitates, which are collected by filtration. The separated precipitates (wet cake) are added to 400 g. of water and dissolved by addition of sodium hydroxide solution, followed by adjusting of the pH to 13.0. Thereafter, the temperature is raised to 80° to 90° C. and maintained at that level for 6 hours. After addition of 60 g. of 78% sulfuric acid thereto, the heating is continued for 1 hour. After cooling down to 60° C., the formed precipitates are collected by filtration, washed with water and dried. Thus, 10.0 g. of 1,4-diaminoanthraquinone-2,3-dicarboxylic acid anhydride is obtained in the yield of 93.5%.

A mixture of 9.24 g. of 1,4-diaminoanthraquinone-2,3-dicarboxylic acid anhydride obtained as above, 5.0 g. of isobutylamine and 80 g. of isobutanol is stirred for 5 hours at 100° C. After cooling, the formed precipitates are collected by filtration, washed with a little amount of isobutanol and then with hot water and dried. Thus, 9.80 g. of 1,4-diaminoanthraquinone-2,3-dicarboxy-(isobutyl)-imide, M.P. 248–250° C., is obtained in the yield of 90% (the total yield being 84.1% based upon the amount of the starting dinitrile). The dyestuff obtained as above is suitably employed for dyeing synthetic fibers in greenish blue shade with high fastnesses. In the case where 1,4-diaminoanthraquinone-2,3-dicarboximide is similarly subjected to the reaction with isobutylamine in isobutanol for 5 hours at 100° C., no reaction proceeds and the objective dyestuffs cannot be obtained. According to the method described in the specification of Japanese patent publication No. 3,384/1955, the yield of purified 1,4-diaminoanthraquinone-2,3-dicarboximide is 73%, based upon the amount of the starting dinitrile and that of the objective dyestuffs is 90% under the reaction of the imide with a amine at 170° to 175° C. for 5 hours.

Consequently, the total yield of the objective dyestuff is 66.7%, based upon the amount of the starting dinitrile. When not purified, the imide is obtained in the yield of 93%. And the objective dyestuff is obtained in the yield of 81% by using the whole amount of the unpurified imide obtained as above. So, the total yield is 75.3%, based upon the amount of the starting dinitrile.

Example 2

To 150 g. of 17% oleum (fuming sulfuric acid having 17% $SO_3$ concentration), 10.0 g. of 1,4-diaminoanthraquinone-2,3-dinitrile is added portionwise at 30° C. and the mixture is stirred for 2 hours at the same temperature. A reddish solution of the monosulfone of 1-hydroxy-3-imino-4,7-diamino-5,6-phthaloylisoindolenine is obtained.

The reddish solution is added to a mixture of 208 g. of 30.8% aqueous sodium hydroxide and 1300 g. of ice water at a temperature of 0° to 5° C. The mixture is adjusted to pH 13.0, heated to a temperature of 90° to 95° C. and stirred for 2 hours at the same temperature, thereby to obtain a reddish solution, which is presumed to be a solution of the monosulfone of 1,4-diaminoanthraquinone-2,3-dicarboxylic acid. After dropwise addition of 60 g. of 50% sulfuric acid thereto, the reaction mixture is stirred at a temperature of 80° to 100° C. for 1 hour.

The formed precipitates are collected by filtration, washed with water and dried. Thus, 9.6 g. of 1,4-diaminoanthraquinone-2,3-dicarboxylic acid anhydride is obtained in the yield of 90%. Elementary analysis is as follows.

Calc. (as $C_{16}H_8O_5N_2$): N, 9.09%. Found: N, 9.16%.

To 80 g. of methanol, 6.2 g. of 1,4-diaminoanthraquinone-2,3-dicarboxylic acid anhydride and 9 g. of n-butylamine are added and the mixture is stirred at 67° C. for 15 hours.

After cooling, the formed precipitates are collected by filtration, washed with methanol and dried. Thus, 6.8 g. of 1,4 - diaminoanthraquinone - 2,3-dicarboxy-(n-butyl)-imide, M.P. 210–213° C., is obtained in the yield of 84.6%, based upon the amount of the starting dinitrile.

This dyestuff is suitably employed for dyeing synthetic fibers in greenish blue shade with high fastnesses. Even if 1,4-diaminoanthraquinone-2,3-dicarboximide is subjected to the reaction with n-butylamine under the same conditions as mentioned above, the condensation reaction does not proceed completely.

Example 3

To 120 g. of 15% oleum (fuming sulfuric acid having 15% $SO_3$ concentration), 10.0 g. of 1,4-diaminoanthraquinone-2,3-dinitrile is added at 30° C. and the mixture is stirred for 2 hours at the same temperature. After pouring the reaction mixture into 1000 g. of ice water, the formed precipitates are collected by filtration.

The wet precipitates are added to 400 g. of cooled water and dissolved by addition of sodium hydroxide, followed by adjusting pH to 12.5. The temperature is raised to 90° to 100° C., and maintained at that level for 2 hours.

After addition of 20 g. of 50% sulfuric acid thereto, the heating is continued at that temperature for 1 hour. The formed precipitates are collected by filtration, washed with water and dried. Thus, 10.0 g. of 1,4-diaminoanthraquinone-2,3-dicarboxylic acid anhydride is obtained in the yield of 93.5%.

A mixture of 6.2 g. of 1,4-diaminoanthraquinone-2,3-dicarboxylic acid anhydride, 9 g. of γ-methoxypropylamine and 84 g. of methanol is heated to 67° C. and stirred for 8 hours at the same temperature. After cooling, the formed precipitates are collected by filtration, washed with methanol and dried.

Thus, 6.9 g. of 1,4-diaminoanthraquinone-2,3-dicarboxy-(γ-methoxypropyl)-imide, M.P. 191–193° C., is obtained in the total yield of 84.6%, based upon the amount of the starting dinitrile.

This dyestuff is suitably employed for dyeing synthetic fibers in greenish blue shade with high fastnesses. Even when 1,4-diaminoanthraquinone-2,3-dicarboximide is subjected to the reaction with the amine in methanol for 12 hours at 67° C., the condensation reaction does not proceed completely. According to the method described in U.S. Patent No. 2,753,356 in which the dinitrile is subjected to the reaction to obtain the carboximide, the total yield of the γ-methoxypropylimide is 69.5% at highest.

Example 4

To 120 g. of 12% oleum (fuming sulfuric acid having 12% $SO_3$ concentration), 10.0 g. of 1,4-diaminoanthraquinone-2,3-dinitrile is added at a temperature of 30° to 40° C. and the mixture is stirred for 2 hours at room temperature. After pouring the reaction mixture to 1000 g. of ice water, 30 g. of aqueous sodium hydroxide solution is added dropwise thereto at 5° to 20° C., followed by adjusting pH to 13.0. Then, the temperature is raised to 90° to 100° C., and maintained at that level for 2 hours.

After addition of 100 g. of 35% hyrochloric acid thereto at the same temperature, the heating is continued for 1 hour. The formed precipitates are collected by filtration, washed with water and dried. Thus, 10.0 g. of the dicarboxylic acid anhydride is obtained in the yield of 93.5%. A mixture of 6.16 g. of 1,4-diaminoanthraquinone-2,3-dicarboxylic acid anhydride obtained as above, 6.1 g. of ethanolamine and 56 g. of isobutanol is stirred for 5 hours at 108° C.

After cooling, the formed precipitates are collected by filtration, washed with a small amount of isobutanol and dried. Thus, 6.58 g. of 1,4-diaminoanthraquinone-2,3-dicarboxy-(β-oxyethyl)-imide, M.P. 292–298° C., which is suitably employed for dyeing synthetic fibers in blue shade, is obtained in the yield of 88%, based upon the amount of the starting dinitrile.

When 1,4-diaminoanthraquinone-2,3-dicarboximide is mixed with the amine at 200° C. under such conditions described in Japanese patent publication No. 3,384/1955, reddish by-products are produced. This process is inferior not only in its impure product but in the lower yield.

*Example 5*

In 150 g. of 100% sulfuric acid, 10.0 g. of 1,4-diaminoanthraquinone-2,3-dinitrile is dissolved at 30° C. and the solution is stirred for 2 hours at the same temperature. Then, the reaction mixture is discharged into 1500 g. of ice water to form precipitates, which are collected by filtration.

The thus obtained 1-hydroxy-3-imino-4,7-diamino-5,6-phthaloylisoindolenine is added to 500 g. of water and the pH is adjusted to 13.3 by dropwise addition of a sodium hydroxide solution. The temperature is raised to 90° to 100° C. and maintained at that level for 5 hours. Then, 30 g. of 70% sulfuric acid is added thereto at the same temperature. The reaction mixture of 6.16 g. of 1,4-diaminoanthraquinone-2,3-dicarboxylic acid anhydride obtained as above, 15 g. of p-butylaniline and 47 g. of o-dichlorobenzene is heated for 2 hours at 120° C.

After cooling, the formed precipitates are collected by filtration, washed with methanol and dried.

Thus, 7.12 g. of 1,4-diaminoanthraquinone-2,3-dicarboxy-(p-butylphenyl)-imide, M.P. 262–268° C., which is suitably employed for dyeing synthetic fibers in blue shade, is obtained in the yield of 80%, based upon the amount of the starting dinitrile.

*Example 6*

According to the same procedure as described in Example 4 with the exception of using 9.9 g. of cyclohexylamine instead of the ethanolamine, 7.17 g. of 1,4-diaminoanthraquinone - 2,3 - dicarboxy - (cyclohexyl) - imide, M.P. higher than 290° C., is obtained in the yield of 86%, based upon the amount of the starting dinitrile.

*Example 7*

According to the same procedure as described in Example 4 with the exception of using 10.7 g. of benzylamine instead of the ethanolamine, 7.22 g. of 1,4-diaminoanthraquinone-2,3-dicarboxy-(benzyl)-imide, M.P. 291–293° C., is obtained in the yield of 85.2%, based upon the amount of the starting dinitrile.

*Example 8*

According to the same procedure as described in Example 4 with the exception of using 10.2 g. of γ-dimethylaminopropylamine instead of the ethanolamine, isopropyl alcohol instead of isobutanol and heating conditions at 85° C. for 8 hours, 7.2 g. of 1,4-diaminoanthraquinone-2,3 - dicarboxy - (γ - dimethylaminopropyl) - imide, M.P. 211°–212° C., which is suitably employed for dyeing synthetic fibers in blue shade, is obtained in the yield of 85.2%, based upon the amount of the starting dinitrile.

What we claim is:

1. A process for producing a 1,4-diaminoanthraquinone-2,3-dicarboximide compound having the formula,

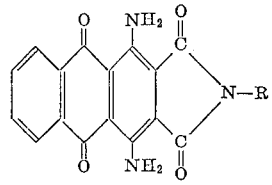

wherein R means a radical selected from the group consisting of aliphatic, cycloaliphatic, aromatic-aliphatic and aromatic radicals, which comprises treating 1,4-diaminoanthraquinone-2,3-dinitrile with fuming sulfuric acid having an $SO_3$ concentration of 0% to 30% at a temperature of 10° to 50° C. to form at least one member selected from the group consisting of 1-hydroxy-3-imino-4,7-diamino-5,6-phthaloylisoindolenine and its sulfone derivative, heating the product in an aqueous alkaline solution, acidifying the solution to obtain at least one member selected from the group consisting of 1,4-diaminoanthraquinone-2,3-dicarboxylic acid, its acid anhydride and mixtures thereof, and treating the product with an amine having the formula of R—$NH_2$, wherein R has the same meanings as identified above, at a temperature of 50° to 130° C.

2. Process as defined in claim 1, wherein the said amine is isobutylamine.

3. Process as defined in claim 1, wherein the said amine is n-butylamine.

4. Process as defined in claim 1, wherein the said amine is γ-methoxypropylamine.

5. Process as defined in claim 1, wherein the said amine is ethanolamine.

6. Process as defined in claim 1, wherein the said amine is p-butylaniline.

7. Process as defined in claim 1, wherein the said amine is cyclohexylamine.

8. Process as defined in claim 1, wherein the said amine is benzylamine.

9. Process as defined in claim 1, wherein the said amine is γ-dimethylaminopropylamine.

10. Process as defined in claim 1, wherein the said fuming sulfuric acid has an $SO_3$ concentration of 10 to 20%.

References Cited by the Examiner

UNITED STATES PATENTS 2,628,963  2/1953  Laucius et al. _____ 260—326
2,749,354  6/1956  Baer _____ 260—326

OTHER REFERENCES

Marschalk: Bull. Soc. Chim., vol. 5, 1935, pages 1809–1830.

ALEX MAZEL, *Primary Examiner.*

HENRY R. JILES, *Examiner.*

MARY O'BRIEN, *Assistant Examiner.*